(12) United States Patent
Slingerland

(10) Patent No.: US 12,550,458 B2
(45) Date of Patent: Feb. 10, 2026

(54) SOLAR PANEL USING BACK-CONTACTED SOLAR CELLS

(71) Applicant: Lightyear Layer IPCo B.V., Helmond (NL)

(72) Inventor: Hendrik Nicolaas Slingerland, Venlo (NL)

(73) Assignee: Lightyear Layer IPCo B.V., Helmond (NL)

( * ) Notice: Subject to any disclaimer, the term of this patent is extended or adjusted under 35 U.S.C. 154(b) by 0 days.

(21) Appl. No.: 18/713,934

(22) PCT Filed: Dec. 14, 2022

(86) PCT No.: PCT/EP2022/085856
§ 371 (c)(1),
(2) Date: May 28, 2024

(87) PCT Pub. No.: WO2023/111020
PCT Pub. Date: Jun. 22, 2023

(65) Prior Publication Data
US 2025/0022975 A1  Jan. 16, 2025

(30) Foreign Application Priority Data
Dec. 14, 2021 (NL) .................................... 2030125

(51) Int. Cl.
*H10F 19/85* (2025.01)
*H02S 20/30* (2014.01)

(52) U.S. Cl.
CPC .............. *H10F 19/85* (2025.01); *H02S 20/30* (2014.12)

(58) Field of Classification Search
CPC ...... H10F 77/955; H10F 19/908; H10F 19/80; H10F 19/85; H02S 40/36; H02S 30/00; H02S 40/34
See application file for complete search history.

(56) References Cited

U.S. PATENT DOCUMENTS

2006/0283628 A1* 12/2006 Feldmeier ......... B32B 17/10036
174/260
2010/0012172 A1* 1/2010 Meakin ................... H10F 19/80
136/251
(Continued)

FOREIGN PATENT DOCUMENTS

DE 102010000893 A1 * 7/2011 .............. B60L 8/003
EP 2264782 A1 12/2010
(Continued)

OTHER PUBLICATIONS

English machine translation of Meyer (DE 10 2010 000893) published Jul. 21, 2011.*
(Continued)

*Primary Examiner* — Christina Chern
(74) *Attorney, Agent, or Firm* — Patterson + Sheridan, LLP

(57) ABSTRACT

The invention relates to a solar panel comprising: • a transparent plate. • back-contacted solar cells adhered to the transparent plate. • a back-contact foil (302) electrically and mechanically connected to the solar cells, the back-contact foil equipped with a metallisation pattern facing the solar cells, • a laminate attached to the back-contact foil. characterized in that • the back-contact foil shows one or more flaps (304), the end of the flaps more removed from the transparent plate than from the laminate. The back-contact foil is embedded in encapsulant. By adding flaps to the back-contact foil, it is possible to have the end of the flaps extending out of the encapsulant. This enables, for example, the use of connectors for making electric contact to the end of the flaps.

10 Claims, 2 Drawing Sheets

(56) References Cited

U.S. PATENT DOCUMENTS

2011/0017281 A1* 1/2011 Funakoshi ............ H10F 19/908
    136/251
2021/0249549 A1 8/2021 Gaume et al.

FOREIGN PATENT DOCUMENTS

| JP | 2012033914 A | 2/2012 |
| WO | 2020064474 A1 | 4/2020 |

OTHER PUBLICATIONS

English machine translation of Komai et al. (JP 2012-033914) published Feb. 16, 2012.*
Netherlands Search Report and Written Opinion dated Mar. 12, 2022, for Netherlands Application No. 2030125.
PCT International Search Report and Written Opinion dated Feb. 23, 2023, for International Application No. PCT/EP2022/085856.

\* cited by examiner

SOLAR PANEL USING BACK-CONTACTED SOLAR CELLS

TECHNICAL FIELD OF THE INVENTION

The invention relates to a solar panel comprising:
a transparent plate,
back-contacted solar cells adhered to the transparent plate,
a back-contact foil electrically and mechanically connected to the solar cells, the back-contact foil equipped with a metallisation pattern facing the solar cells,
a laminate attached to the back-contact foil.

The invention further relates to a vehicle equipped with such a panel, a yacht or a boat.

BACKGROUND OF THE INVENTION

Solar energy is typically generated by solar cells, such as silicon photovoltaic cells. Older technology uses solar cells with metal electrodes on both sides, while modern solar cells, so-called back-connected cells, show electrodes at one side only. The photosensitive side of these cells is now completely free of metal traces and thus the surface of photosensitive silicon is increased.

These back-connected cells can be interconnected (serialized, parallelized) using a back-contact foil, a polymer film (typically PET) that is covered at one side with a patterned metallization layer, typically a copper layer. The back-contact foil thus resembles a flexible printed circuit board. Electric contact with the back-contacted cells is typically made by electrically conductive glue or paste, that is cured at elevated temperatures.

Solar panels are not only used as static, flat solar panels, mounted as solar cells between a glass plate and a metal mounting structure, but also as, for example, the roof and bonnet of a solar powered vehicle such as the Lightyear One, sold by Atlas Technologies, Helmond, the Netherlands. Preferably, to lower the used power per kilometre, such a car should be lightweight and, to optimize the amount of electricity generated by the solar cells, have as much solar panel area as possible. Use of the complete bonnet, roof and trunk are therefore necessary. Typically the bonnet (as well as the roof and trunk) comprises therefore a glass plate curved, at least locally, in two directions, encapsulated photovoltaic devices in the form of solar cells as, for example, described in International Patent Application Publication WO2020064474A1. It is noted that the use of a polycarbonate plate is known as well.

For further strength a laminate, preferably a composite laminate as described in Dutch Patent Application NL2026972 is used to support the side opposite to the transparent plate. Another demand is that the vehicle is safe and sufficiently robust. Especially the bonnet of a vehicle must be capable to withstand an impact with a pedestrian. The composite laminate strengthens the panel, and, as the glass is adhered to the laminate via an encapsulant such as EVA (Ethylene Vinyl Acetate) also ensures that, if the glass breaks, all shards stay together (bonded to the laminate), thus reducing possible damage to for example pedestrians.

All earlier mentioned components are bonded together with encapsulants, such as EVA. The bonding takes place by cross-linking the encapsulant at an elevated temperature of, for example, between 120° C.-140° C. At this temperature also the conductive glue forms a bond between the solar cells and the back-contact foil. It is noted that all bonding can take plate in one session, or that several sessions may take place.

To contact the solar panels presently wires are soldered to the copper layer of the back-contact foil. The soldering to the copper layer brings a risk of melting of the PET and thus damage to the back-contact foil. Another type of connection would be preferred, for example by gluing. However, this has as drawback that stresses can cause cracks in the connections. Also, connectors can hardly be used, as this implies that the connectors will be embedded in the encapsulant. Further, such connectors will cause unwanted height differences in the encapsulant The invention intends to avoid, or at least lessen, these drawbacks.

SUMMARY OF THE INVENTION

To that end the panel according to the invention is characterized in that the back-contact foil shows one or more flaps, the end of the flaps more removed from the transparent plate than from the laminate.

By having the ends of the flaps removed from the transparent plate and sticking out of the encapsulant, point welding, laser welding, soldering or a connection using connectors can be used after encapsulating (curing) the solar plate.

In an embodiment the panel is at least locally curved in two directions.

Solar panels are not only used as static, flat solar panels, mounted as solar cells between a glass plate and a metal mounting structure, but also as, for example, the roof and bonnet of a solar powered vehicle such as the Lightyear One, sold by Atlas Technologies, Helmond, the Netherlands. Also, in Building Integrated Photovoltaic Systems (BIPS) curved panels are used.

In another embodiment the transparent plate is a glass plate or a polycarbonate plate.

A transparent plate (transparent to infra-red and visible light) is preferably made of glass or, as a less expensive solution, PC (polycarbonate). The reason that the plate must also be transparent to infrared is that high efficiency solar cells, such as silicon solar cells, get part of their yield from photons in the infrared spectrum.

In yet another embodiment the laminate comprises one or more layers of glass fibres and/or one or more layers of carbon fibres.

Using a laminate comprising one or more layers of glass fibres and/or one or more layers of carbon fibres, a laminate can be made that has a thermal expansion coefficient that is close to that of glass, thus avoiding the build-up of stress. This is described in Dutch Patent Application NL2026972.

In another embodiment a connector is clamped on the flap.

By clamping a connector over the flap, a reliable connection is made between the copper of the back-contact foil and wires ending in the connector. Such a connector is, for example, described in European patent EP0731524B1.

In a further embodiment the metallization of the flaps is used to make a removable connection with the connector.

The connection can be a fixed connection, but also a removable connection can be used. This is especially useful for, for example, Building Integrated Photovoltaic Systems (BIPS) that might be exchanges, such as roof tiles.

In another embodiment the flaps are folded over the laminate.

In this embodiment the metallization becomes visible as it is most removed from the transparent plate. Using a back-contact foil this might be difficult when using PET foil, but if a more flexible foil is used this enables easier soldering.

It is noted that, as PET is quite rigid, local heating may be needed to (de)form the PET. However, other materials that are more flexible may be used as well, possibly without local heating.

In yet another embodiment wires or bus bars are soldered to the metallization of the flaps.

Here non-removable connections are made using solder to the metallization (copper) of the back-contact foil. The connection can be soldered before curing the encapsulant of afterwards.

In still another embodiment the laminate shows indents. These indents make it possible to avoid fibres puncturing the back-contact foil. In a variant of this embodiment, the laminate shows indents to avoid fibres puncturing the back-contact foil.

If the laminate comprises glass fibre or carbon fibre the fibres, when extending at the edge of the laminate, can puncture the back-contact foil. This is especially harmful when this concerns carbon fibres, as these are electrically conductive, and thus may cause shorts. By making a laminate with indents, thus removing the periphery of the laminate a distance, for example one centimetre, from the position where the back-contact foil bends, the chances of a puncture and thus of a short are greatly diminished. So, optionally, in this embodiment, at the location of the indents the periphery of the laminate is at a distance from the position where the back-contact foil bends, i.e. from the folding lines over which the flaps are folded.

In yet another embodiment a layer of an encapsulant adheres the solar cells to the transparent plate.

The encapsulant, typically a cured elastomeric polymer, adheres the solar cells to the transparent plate.

In a further embodiment the encapsulant is EVA.

EVA (a co-polymer of Ethylene and Vinyl Acetate) is a well-known encapsulant that is transparent and UV resistant, making is well suited as an encapsulant. Curing temperature is between 120° C. and 140° C.

In an aspect a vehicle is equipped with a solar panel according to any of the preceding embodiments.

A solar panel can be used in a so-called solar vehicles, in which at least part of the propulsive power is generated by solar cells, or in a vehicle where solar panels generate at least part of the energy needed for auxiliary functions like audio, air-conditioning, etc.

In another embodiment the panel is at least part of the bonnet and/or the roof and/or the trunk of a vehicle.

The roof, trunk and bonnet are locations where most efficiently solar energy can be generated. However, also side panels are known to be used.

In another aspect a yacht or boat equipped with a solar panel according to any of the preceding claims.

BRIEF DESCRIPTION OF THE DRAWINGS

The invention is now elucidated using figures, in which identical reference signs indicate corresponding features. To that end.

DETAILED DESCRIPTION OF THE INVENTION

Figure 1:
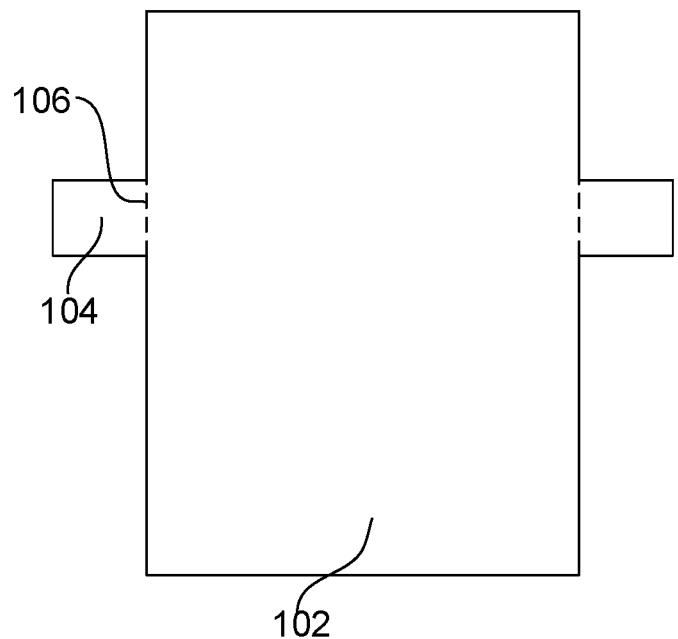
FIG. 1 schematically shows a bottom view of back-contact foil according to the invention, FIG. 2 schematically shows a sandwich of a back-contact foil and a laminate according to the invention, FIG. 3 show schematically a cross section of a solar panel, and FIG. 4 schematically shows an alternative form of the back-contact foil according to the invention.

FIG. 1 schematically shows a bottom view of a back-contact foil 102 according to the invention, that is: a view at the side most removed from the transparent plate.

The back-contact foil, or BCF, 102 is a roughly rectangular a substrate film, for example PET, with a patterned conductive layer, typically a copper layer with a thickness of between 50 and 100 µm at the top. The foil shows flaps 104 that can be folded downwards along folding lines 106 (away from the transparent plate). A flap can comprise one copper track, or it may comprise several tracks.

It is noted that also another substrate material than PET can be used, such as a polyimide or a polyester film. For the conductive layer normally copper is used, but also (alloys of) aluminium, nickel, gold and silver etc. are known to be used.

Figure 2:
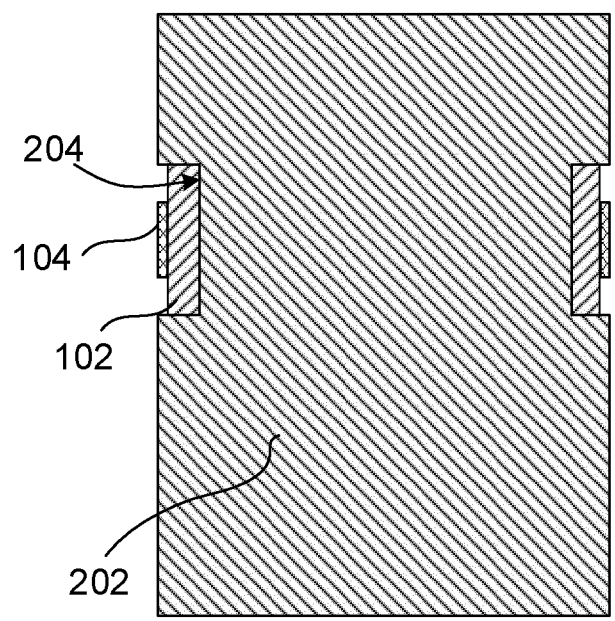

FIG. 2 schematically shows a sandwich of a back-contact foil 102 and a laminate 202 according to the invention.

FIG. 2 also shows a view form the bottom side, but now the laminate 202 is placed on the BCF 102. The flaps 104 are folded downwards (towards the viewer). The laminate 202 shows indents 204 to locally increase the distance between BCF and laminate and thereby avoid any of the fibres of the laminate (glass fibres or carbon fibres) to pierce through the flaps of the BCF. Especially carbon fibres can otherwise cause problems, as they are conductive and thus may cause shorts.

Figure 3:
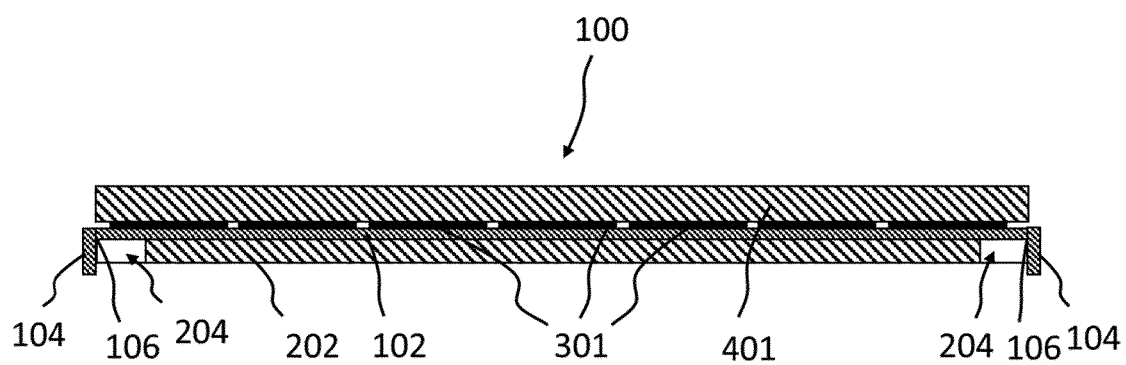

FIG. 3 schematically shows a cross section of a solar panel 100 having a transparent plate 401, back-contacted solar cells 301 adhered to the transparent plate 401, a back-contact foil 102 electrically and mechanically connected to the solar cells 301, the back-contact foil 102 equipped with a metallisation pattern facing the solar cells 301, and a laminate 202 attached to the back-contact foil 102. The back-contact foil 102 shows flaps 104, the end of the flaps 104 more removed from the transparent plate 401 than from the laminate 202.

In this embodiment, the flaps 104 are folded along folding lines 106 away from the transparent plate 401. The folding lines 106 are shown as sharp folds. In practice, the folding may also be more gradually. The laminate 202 shows indents 204 to locally increase the distance between BCF 102 and laminate 202, at least at the locations of the folding lines 106 of the flaps 104 and thereby avoid any of the fibres of the laminate (glass fibres or carbon fibres) to pierce through the flaps 104 of the BCF 102. Thus, at the location of the indents 204 the periphery of the laminate 202 is at a distance from the respective folding lines 106, as also shown in FIG. 2.

The indents 204 may be formed in the laminate 202 during creation of the laminate 202 or formed later, for example by cutting the indents 204 into the laminate 202.

The solar panel 100 of FIG. 3 is flat, but in alternative embodiments the solar panel 100 may be curved in one or more directions.

Figure 4:
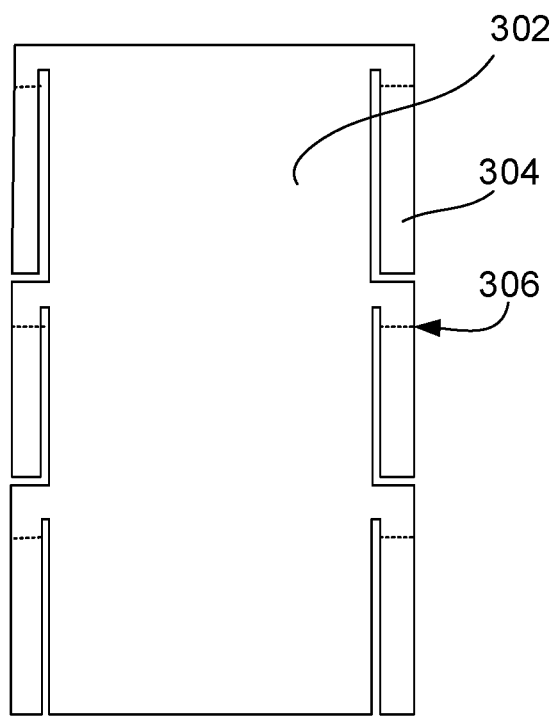

FIG. 4 schematically shows an alternative form of the back-contact foil according to the invention.

Here the flaps 304 do not extend from the BCF 302 but are arranged parallel to the sides of the BCF. As a result thereof the flaps need not be folded so acute, and the stiffness of, for example, PET is of less importance. A slight bend is started at line 306, and extends to the end of the flap 304. The end of the flap is preferably more or less parallel to the BCF 302 and the laminate (not shown in this drawing) and a connector can be clamped on it.

It is noted that, although in FIGS. 1, 2, 3 and 4 the flaps are formed at two opposite sides of the BCF, the flaps can be formed at one, two, three of four sides, and need not oppose each other.

The BCF can have metallization on one side (as normally is the case), but also two sided metallization is known. This enables the use of connectors for two-sided metallization, Although it is most convenient to place the flap or flaps at the circumference of the BCF, even a flap in the middle of the BCF can be imagined, although this would also imply that a cut-out is made in the laminate.

The different components of the solar panel are encapsulated by cured layers of encapsulant, such as EVA. The transparent plate can be a (flat or curved) plate of glass, polycarbonate, coated polycarbonate, Plexiglass®, acrylic, etc.

Electric contacts between the electrodes of the solar cells and the BCF are made by, for example, (cured) conductive glue or by solder, although also laser welding is known to be used.

Electric contact between the flaps and wires and/or bus bars is typically made by (cured) conductive glue, solder or connectors, although also spot welding, laser welding and other techniques may be used.

Many types of photovoltaic cells are known, most based on silicon (monocrystalline and polycrystalline), but also PV cells comprising Gallium, CadmiumTelluride, CopperIndium-diSelenide, perovskites, multi-junction, etc. are known, and many others are expected to follow.

The invention claimed is:

1. A solar panel comprising:
   a transparent plate,
   back-contacted solar cells adhered to the transparent plate,
   a back-contact foil electrically and mechanically connected to the solar cells, the back-contact foil equipped with a metallisation pattern facing the solar cells,
   a laminate attached to the back-contact foil,
   wherein the back-contact foil comprises one or more flaps, the end of the one or more flaps more removed from the transparent plate than from the laminate, and wherein the one or more flaps are folded over the laminate, and wherein the one or more flaps are folded over a folding line and in which the laminate comprises indents, and wherein at the location of the indents the periphery of the laminate is at a distance from the respective folding lines.

2. The solar panel of claim 1 in which the panel is at least locally curved in two directions.

3. The solar panel of claim 1 in which the transparent plate is a glass plate or a polycarbonate plate.

4. The solar panel of any of claim 1 in which the laminate comprises one or more layers of glass fibres and/or one or more layers of carbon fibres.

5. The solar panel of claim 1 in which wires or bus bars are soldered to the metallization of the one or more flaps.

6. The solar panel of claim 1 in which a layer of an encapsulant adheres the solar cells to the transparent plate.

7. The solar panel of claim 6 in which the encapsulant is EVA.

8. A vehicle equipped with a solar panel according claim 1.

9. The vehicle of claim 8 in which the solar panel is at least part of a bonnet and/or a roof and/or a trunk of the vehicle.

10. A yacht or boat equipped with a solar panel according to claim 1.

* * * * *